US006711296B1

(12) United States Patent
Higuchi et al.

(10) Patent No.: US 6,711,296 B1
(45) Date of Patent: Mar. 23, 2004

(54) APPARATUS FOR PERFORMING LOSS-LESS COMPRESSION-CODING OF ADAPTIVE EVOLUTION TYPE ON IMAGE DATA

(75) Inventors: Tetsuya Higuchi, 3628-20, Kandatsumachi, Tsuchiura, Ibaraki (JP); Takio Kurita, 2-712-1102, Azuma, Tsukuba, Ibaraki (JP); Hidenori Sakanashi, Aichi-ken (JP); Masaharu Tanaka, Aichi-ken (JP)

(73) Assignees: Japan as represented by Secretary of Agency of Industrial Science and Technology, Tokyo (JP); Mitsubishi Heavy Industries, Ltd., Tokyo (JP); Tetsuya Higuchi, Ibaraki (JP); Takio Kurita, Ibaraki (JP)

( * ) Notice: Subject to any disclaimer, the term of this patent is extended or adjusted under 35 U.S.C. 154(b) by 622 days.

(21) Appl. No.: 09/655,869

(22) Filed: Sep. 6, 2000

(51) Int. Cl.⁷ ................................................ G06K 9/36
(52) U.S. Cl. ..................... 382/239; 382/235; 348/404.1; 358/426.02
(58) Field of Search ................................ 382/232–233, 382/235, 238–239, 244, 248, 209; 341/51; 348/404.1; 358/426.02

(56) References Cited

U.S. PATENT DOCUMENTS

| 5,835,034 A | * 11/1998 | Seroussi et al. ............... 341/65 |
| 5,970,174 A | * 10/1999 | Peters ......................... 382/238 |
| 6,449,393 B1 | * 9/2002 | Peters ......................... 382/239 |

FOREIGN PATENT DOCUMENTS

| JP | 5-64007 | 3/1993 |
| JP | 6-90363 | 3/1994 |
| JP | 6-326876 | 11/1994 |
| JP | 11-243491 | 9/1999 |

OTHER PUBLICATIONS

Storer et al., "Data Compression Conference"—Mar. 30, 1998, pp. 219–228.
"Fifteenth National Conference on Artificial Intelligence"—Jul. 26, 1998, pp. 486–491.
Sipper et al., "Evolvable Systems: From Biology to Hardware"—ICES 98, Sep. 23, 1998, pp. 106–114.
"IEEE International Conference on Systems, Man, and Cybernetics"—Oct. 12, 1999.
"FAN Symposium '98"—Oct. 29, 1998, pp. 319–324.
"IEICE Technical Report"—vol. 99, No. 95, May 27, 1999—pp. 17–24.
"IEICE"—vol. J83, No. 5, May 2000—pp. 1274–1283.
Kato et al; "Loss–Less Compression–Coding for Still Image"; Interface, Sep. 96, pp. 104–115—(Discussed in the spec.).
Kato et al; "Adaptive Markov Model Coding for Two–Level Image by Dynamically Selecting Reference Pels"; Transaction of Institute of Electronics, Information and Communication engineers in Japan; vol. J. 70–B, No. 7, pp. 798–804; 1987. (Discussed in the spec.).

* cited by examiner

*Primary Examiner*—Daniel Mariam
(74) *Attorney, Agent, or Firm*—Armstrong, Kratz, Quintos, Hanson & Brooks, LLP

(57) ABSTRACT

An image coding apparatus including a context generator configured to select a reference pixel that has been coded in image data to generate a context formed of the selected reference pixel, an entropy encoder configured to code the image data based on the context to generate coded data, an evaluation value calculator configured to calculating a compression ratio based on the image data and the coded data to output the compression ratio, and an adaptive evolution processor configured to perform adaptive evolution based on the compression ratio to find optimal reference pixels for the image data, the optimal reference pixels being supplied to the context generator for optimizing the context.

8 Claims, 3 Drawing Sheets

APPARATUS FOR PERFORMING LOSS-LESS COMPRESSION-CODING OF ADAPTIVE EVOLUTION TYPE ON IMAGE DATA

BACKGROUND OF THE INVENTION

1. Field of the Invention

The present invention relates to an apparatus for performing loss-less compression-coding of adaptive evolution type on image data.

2. Description of the Related Art

A conventional loss-less compression-coding apparatus is disclosed in Kato and Suzuki, "Loss-less Compression-Coding for Still Image", Interface (Japan), September 1996, pp 104–115. FIG. 1 shows the conventional apparatus for effecting loss-less compression-coding on image data. As shown in FIG. 1, the apparatus comprises a modeling circuit 101 and an entropy encoder 102. The modeling circuit 101 converts original image data to converted data which can be highly compressed and coded by the entropy encoder 102. One example of the converted data is a signal obtained by extracting statistical characteristics from the original image data. The entropy encoder 102 allocates a code to each item of the converted data output from the modeling circuit 101. In other words, the encoder 102 performs compression-coding on the converted data.

With entropy coding, it is impossible to produce a code series that has less entropy than the converted data generated by the modeling circuit 101. Hence, the compression ratio depends upon whether or not the modeling circuit 101 can convert the image data to converted data of small entropy.

The term "entropy" used here means the amount of data, which constitutes one message, Assume that there are M massages $m_1, m_2, \ldots$ that have probabilities of occurrence $P_1, P_2, \ldots$, respectively, and that N messages of these are transmitted for a considerable length of time. The total amount I of data sent in the form of the N messages is given as follows:

$$I = \sum_{i=1}^{M} p_i N \ln(1/P_i) \quad (1)$$

The average amount of data for each message, i.e., the entropy H, is calculated as follows:

$$H = I/N = \sum_{i=1}^{M} p_i \ln(1/P_i) \quad (2)$$

Entropy coding is, by definition, the technique of allocating codes to a signal series and finding the coded data that has an average length as similar as possible to the desired entropy.

Run-length coding, Markov model coding, predictive coding and the like have been proposed as practical modeling methods. A conventional loss-less compression-coding apparatus designed to perform Markov model coding will be described, with reference to FIG. 2.

Generally, each pixel value contained in image data greatly depends on the values of the neighboring pixels. The pixel value represents the gray level of a pixel; it is "0" or "1" for a binary image, and is one ranging from "0" to "255" for a 256-level image. The dependency each pixel value has on the neighboring pixels is utilized in the loss-less compression-coding apparatus that performs Markov model coding. In the apparatus, some of the neighboring pixels already coded are selected for reference pixels. Then, a probability of occurrence is estimated for the value of the pixel to be coded, on the basis of various patterns (or combinations) of the reference pixels. In accordance with the probability of occurrence thus estimated, or the statistical characteristics of the pixel, a suitable code is efficiently allocated to the pixel, thus encoding the pixel. The pattern the reference pixels constitute will be referred to as "context" hereinafter.

As shown in FIG. 2, the loss-less compression-coding apparatus that preforms Markov model coding comprises a context generator 201 and an entropy encoder 202. Original image data 203 is input to the context generator 202 and entropy encoder 202. The context generator 201 is equivalent in function to the modeling circuit 101 of the apparatus shown in FIG. 1. The generator 201 generates a context 204 from the image data to be coded while being compressed. Note that the context 204 is composed of a plurality of reference pixels. The context 204 is supplied to the entropy encoder 202. The encoder 202, which is equivalent to the entropy encoder 102 of the apparatus shown in FIG. 1, effects compression-coding of the image data 203 by using the context 204 to extract the statistical characteristics from the original image data 203.

To generate a context, the context generator 201 uses a template of the type shown in FIG. 3, which designates the positions of the reference pixels with reference to the target pixel to be coded. The template enhances the coding efficiency if designed in accordance with the type of the image (characters, figures, dithered image or the like), as is reported in Kato and Yasuda, "Adaptive Markov Model Coding for Two-Level Images by Dynamically Selecting Reference Pels", Transaction of Institute of Electronics, Information, and Communication engineers in Japan, Vol. J 70-B, No. 7, pp 798–804, July 1987.

However, the conventional techniques described above transaction are disadvantageous in the following respects:

(1) The reference pixels cannot be located at any of desired positions. In other words, the context, i.e., the combination of reference pixels, cannot be designed freely.

(2) No devices are available that can optimize the context.

BRIEF SUMMARY OF THE INVENTION

Accordingly, it is an object of the present invention to provide an apparatus for effectively performing loss-less compression-coding of adaptive evolution type on image data.

An image coding apparatus according to the present invention comprises a context generator configured to select a reference pixel that has been coded in image data to generate a context formed of the selected reference pixel, an entropy encoder configured to code the image data based on the context to generate coded data, an evaluation value calculator configured to calculate a compression ratio based on the image data and the coded data to output the compression ratio, and an adaptive evolution processor configured to perform adaptive evolution based on the compression ratio to find optimal reference pixels for the image data, the optimal reference pixels being supplied to the context generator for optimizing the context.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out hereinafter.

BRIEF DESCRIPTION OF THE DRAWINGS

The accompanying drawings, illustrate preferred embodiments of the present invention and, together with the general description given above and the detailed description of the preferred embodiments given below, serve to explain the principles of the present invention in which.

DETAILED DESCRIPTION OF THE PREFERRED EMBODIMENT

A preferred embodiment of an adaptive, evolution, loss-less compression-coding apparatus according to the present invention will now be described with reference to the accompanying drawings.

Figure 4:
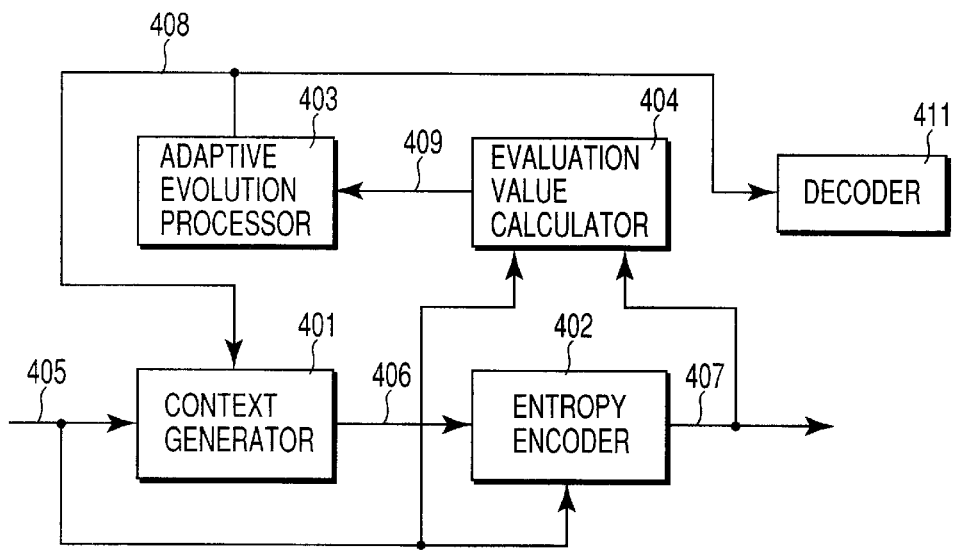
FIG. 4 is a block diagram of an apparatus designed to perform loss-less compression-coding of adaptive evolution type on image data according to an embodiment of the present invention.

FIG. 4 is a block diagram showing the first embodiment. The loss-less compression-coding apparatus of adaptive evolution type shown in FIG. 4 is similar to the conventional apparatus shown in FIG. 1, in terms of its basic conception. The apparatus carries out Markov model coding.

As shown in FIG. 4, the apparatus comprises a context generator 401, an entropy encoder 402, an adaptive evolution processor 403, an evaluation value calculator 404, and a decoder 411. The decoder 411 is not included in the coding apparatus but is shown in FIG. 4 in order to explain the whole system in which the decoder 411 is informed of the template used for encoding.

Original image data 405 is supplied to the context generator 401, entropy encoder 402 and evaluation value calculator 404. The context generator 401 generates the context 406 of the original image data 405 and supplies the context 406 to the entropy encoder 402. The entropy encoder 402 generates coded data 407 from the original image data 405 in accordance with the context 406 thereof. The context 406 is used to extract the statistical characteristics from the original image data. The coded data 407 is supplied to an external apparatus and also to the evaluation value calculator 404.

The evaluation value calculator 404 calculates an evaluation value 409 from the original image data 405 and the coded data 407 thereof. The evaluation value 409 is supplied to the adaptive evolution processor 403. The adaptive evolution processor 403 processes the evaluation value 409, thereby generating template data 408. The template data 408 is supplied to the context generator 401 and the decoder 411. The decoder 411 decodes the coded data based on the template data 408.

Figure 5:
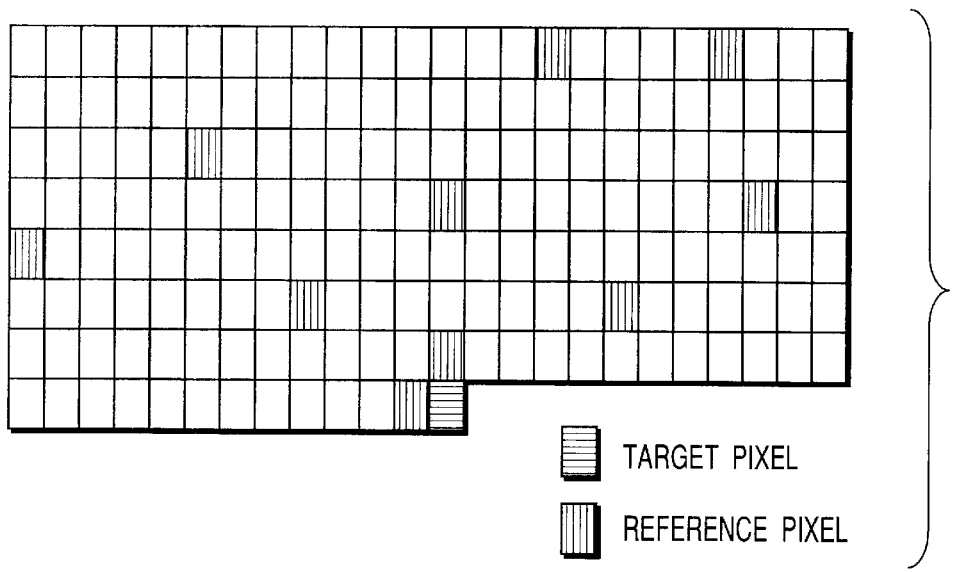
FIG. 5 shows a template used for generating the context in the apparatus shown in FIG. 4.

FIG. 5 shows an example of the template used by the context generator 401 to generate the context 406. In the template according to the present invention, reference pixels may be located at any of a plurality of desired positions in a wider range than that shown in FIG. 2 in which the reference pixels are located close to the target pixel to be coded. The context generator 401 is equivalent to the modeling circuit 101 of the conventional loss-less compression-coding apparatus shown in FIG. 1. The context generator 401 selects some of the reference pixels which have been already coded around the target pixel to be coded based on the template, thereby generating the context 406.

Figure 1:
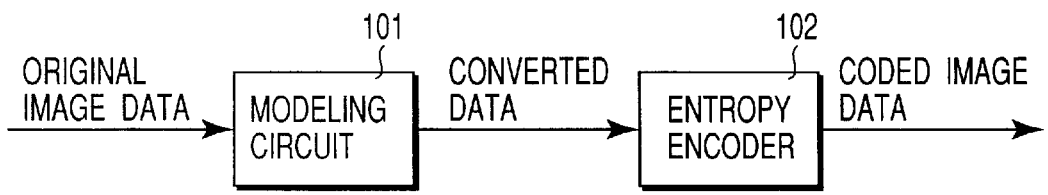
FIG. 1 is a block diagram of a conventional apparatus for effecting loss-less compression-coding of image data.
Figure 2:
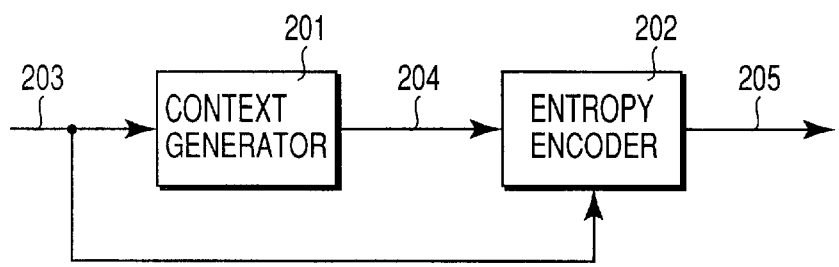
FIG. 2 is a block diagram showing a conventional loss-less compression-coding apparatus designed to preform Markov model coding.
Figure 3:
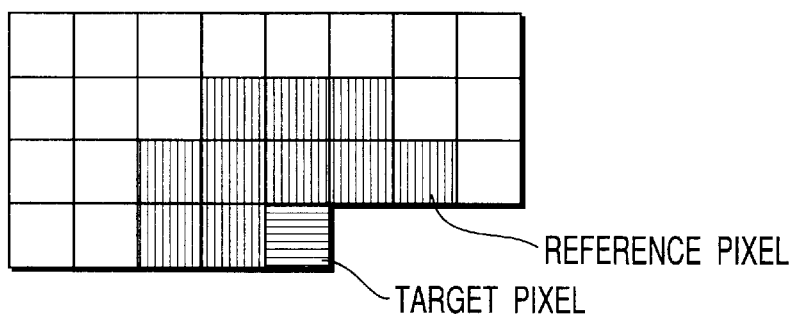
FIG. 3 shows a context used for generating the in the apparatus shown in FIG. 2.

The entropy encoder 402 is equivalent to the entropy encoder 102 provided in the conventional apparatus of FIG. 1. The entropy encoder 402 receives the original image data 405 and the context 406. Using the context 406, the encoder 402 performs compression-coding on the original image data 405.

The evaluation value calculator 404 receives the original image data 404 and the coded data 407. The calculator 406 counts the bits forming the original image data 404 and the bits forming the coded data 407, thereby calculating a compression ratio, or an evaluation value 409. The evaluation value 409 is supplied to the adaptive evolution processor 403.

The adaptive evolution processor 403 effects an evolution calculation in accordance with a genetic algorithm, thus finding optimal positions of the reference pixels for the target pixel to be coded. That is, the processor 403 optimizes the template to increase the compression ratio, whatever data image is supplied to the apparatus. The genetic algorithm is a sequence of arithmetic operations, prepared by modeling the chromosomal evolution in accordance with various rules of group genetics. The algorithm is reputed for its robustness, i.e., presenting a high search ability, not depending on the nature of the problem to solve. It describes one kind of evolution calculation. A chromosome is a series of characters that represents candidates of a solution to the problem. A chromosome the represents better solutions can be generated by implementing genetic manipulation. Genetic manipulation is effected on a group of chromosomes in accordance with the genetic algorithm, thus evolving the chromosomes. There are three representative genetic manipulations: selection, crossover, and mutation. Selection is carried out, using a model of struggle for survival. Crossover is effected, using a model of gene recombination. The phrase of "to effect an evolution calculation" means a paradigm of simplifying or modeling the evolution of living things or the mechanism of evolution, thus formulating an algorithm, and solving engineering problems, such as search and optimization, by applying the algorithm thus formulated. In short, the evolution calculation is a method of finding an object, by utilizing the principles of evolution of living things.

"Template" is the pattern the reference pixels forms. The phrase of "to optimize the template" means the optimization of the pattern of the reference pixels located around the pixel to be coded, which are referred to when the value of the target pixel to be coded is estimated in the predicative coding. The compression ration, which will be finally obtained, greatly changes in accordance with the quality of the template. However, no template can be optimal for all images. Only one optimal template exists for one image. Further, the optical template for a part of an image differs from the optical template for another part of the same image. Hence, it is necessary to find templates optimal to the respective parts of the image. Without such templates, the best possible compression ration cannot be obtained.

As mentioned above, the apparatus shown in FIG. 4 is designed to perform adaptive, evolution, loss-less compression-coding and therefore has the adaptive evolution processor 403. A system is said to be "adaptive" if it changes its behavior in accordance with changes in the dynamic environmental conditions (e.g., the operating conditions, the purpose of operation, and the like), in order to work more efficiently and more reliably. Thus, the adaptive, evolution, loss-less compression-coding of image data is to effect evolution calculation, thereby to find an optimal coding in accordance with the characteristics of the image data, and to increase the compression ratio by performing the optical coding thus found.

Referring back to FIG. 4, the optimal positions for the reference pixels, which the adaptive evolution processor 403 finds, is supplied to the context generator 401, in the form of the template data 408. Meanwhile, the template data 408 is also supplied to the decoder 411.

In the encoding apparatus according to the present invention, the adaptive evolution is first effected on each image data, a template optimal to the image data is then obtained, and the image data is finally coded.

The image data is divided into blocks, each of which is subjected to the adaptive evolution. The template can therefore be optimized for not only the type of the image but also the characteristic of each block of the image.

Moreover, the adaptive evolution may be performed on sample image data, thereby preparing a plurality of templates in advance, and the image data may then be coded by using the templates selectively. This method is desirable in the case where much time cannot spent to perform the adaptive evolution processing at the time of coding.

Figure 6:
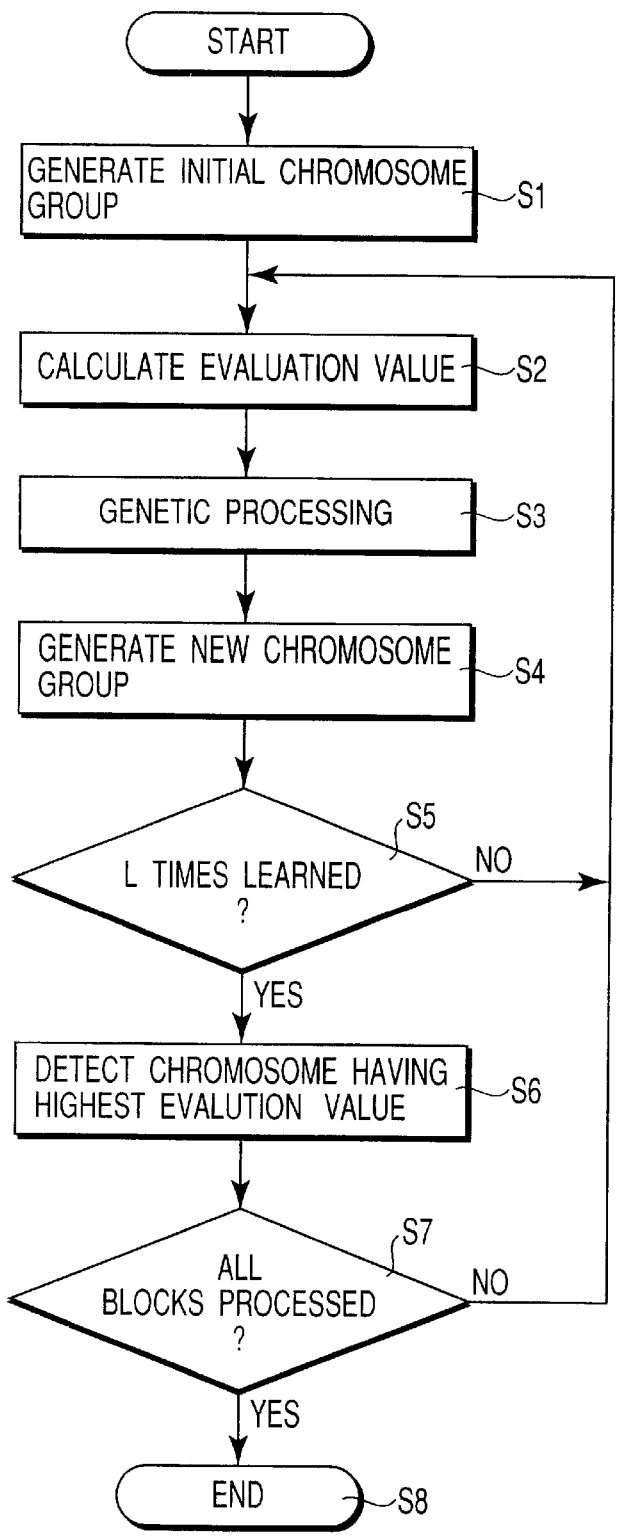
FIG. 6 is a flowchart showing the sequence of the adaptive, evolution compression-coding the apparatus of FIG. 4 preforms.

The sequence of the adaptive evolution will be described, with reference to the flowchart of FIG. 6. This process is carried out by the adaptive evolution processor 403 and the evaluation value calculator 404. In the process, the image data is divided into B data blocks of a specific size (B≧1). When the image data is not divided, B=1. The adaptive evolution is repeated on each data block, L times (L≧1), and has N chromosomes. The chromosomes are allocated to the coordinates of the reference pixels before the adaptive evolution processor 403 performs an evolution calculation in accordance with the genetic algorithm.

First, a group of initial chromosomes is generated (Step S1). Appropriate templates already obtained are prepared. Nonetheless, it is more desirable to prepare an initial template by a statistical technique such as multiple regression analysis.

Next, the evaluation value calculator 404 calculates an evaluation value (Step S2). The value is supplied to the adaptive evolution processor 403. The processor 403 carries out genetic manipulation, using the evaluation value (Step S3). The larger the evaluation value of the chromosome is, the higher the probability the chromosome is to be selected. Stated another way, the chromosome having the large evaluation value is easy to be survived in the genetic manipulation. A group of next-generation chromosomes is thereby generated (Step S4).

Note that the genetic manipulation may be selection, crossover or mutation. The sequence of the calculation of an evaluation value, genetic manipulation and generation of new chromosomes is repeated the prescribed number of times, i.e., L times (Step S5). Of the chromosomes generated, the one having the largest evaluated value is determined to be the template for the block of image data (Step S6).

Upon completion of the adaptive evolution on the first block of the image data, the adaptive evolution is effected on the next block of the image data (Step S7).

The sequence of Steps S2 to S7 is repeated until templates optimal to all blocks of the image data are generated (Step S8).

The pixels constituting the image data are compression-coded, by using the templates generated for the respective blocks of the image data. Each template is supplied to the decoder 411, in the form of header data. The header data includes template data indicating what template is used to compression-code a data block and the data item representing the size of the data block. The header data will be added to a series of compressed data items.

In step S1 of generating the group of initial chromosomes, no chromosomes may not be generated. Rather, the chromosomes that have been generated for the previous image data or block may be utilized to generate initial templates for the blocks of the image data. That is, the chromosomes generated in the past are stored and used, making it unnecessary to generate initial templates. This helps to enhance the speed of adaptive evolution.

As described above, the templates are optimized in accordance with the characteristics of the image data. The compression ratio can therefore be increased in the loss-less compression-coding apparatus of the invention. By contrast, the conventional coding apparatus, in which some coding methods or templates are selectively used in accordance with the characteristics of the image, cannot code the image data at a high compression ratio when the characteristics of the image data is unknown.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents. For example, the modeling method is not limited to Markov model coding. Rather, it may be run-length coding, predictive coding or the like.

As has been described, the apparatus according to the present invention can determine a coding method optimal to the input image data from the characteristic of the image data. Therefore, the ratio at which the image data is compressed can be increased, and time and labor can be saved that should otherwise be spent to prepare various coding methods. More specifically, the present invention has the following advantages:

(1) A plurality of reference pixels can be arbitrarily set.
(2) Adaptive optimization of the positions of reference pixels can be accomplished by using a genetic algorithm or multiple regression analysis.
(3) The positions of the reference pixels are optimized in accordance with the reference characteristic of the image data, thereby enhancing the efficiency of the coding.
(4) The input image is divided into blocks, each of which is subjected to adaptive evolution. Thus, the reference pixels can be optimized in accordance with the characteristic of each block, thereby encoding the image data with high efficiency.
(5) Templates are prepared for the blocks of image data, respectively. The templates can be selectively used based on the blocks, thus encoding the image data.

(6) Adaptive evolution is effected on original image data, thereby preparing a plurality of templates. The templates can be selectively used based on the blocks, thus encoding the image data.

(7) Any template prepared by encoding the input image data can be transmitted to the decoder before the decoder decodes a series of compressed data items to the input image data.

What is claimed is:

1. An image coding apparatus comprising:

a context generator configured to select reference pixels that have been coded in image data based on a template to generate a context formed of the selected reference pixel;

an entropy encoder configured to code the image data based on the context to generate coded data;

an evaluation value calculator configured to calculate a compression ratio based on the image data and the coded data to output the compression ratio; and an adaptive evolution processor configured to perform adaptive evolution based on the compression ratio to an find optimal template for the image data, the optimal template being supplied to said context generator for optimizing the template.

2. The apparatus according to claim 1, wherein said context generator selects a plurality of reference pixels that have been coded in image data to generate a context formed of the selected reference pixels.

3. The apparatus according to claim 1, wherein said adaptive evolution processor optimizes the context by using a genetic algorithm or multiple regression analysis.

4. The apparatus according to claim 1, wherein said adaptive evolution processor optimizes the context in accordance with statistical characteristics of the image data.

5. The apparatus according to claim 1, wherein said adaptive evolution processor divides the image data into blocks and performs adaptive evolution on each block, thereby optimizing the context in accordance with statistical characteristics of each block.

6. The apparatus according to claim 5, wherein said adaptive evolution processor generates a template for each of the blocks generated by dividing the image data.

7. The apparatus according to claim 1, wherein said adaptive evolution on sample image data, thereby generating templates, and said entropy encoder selective uses the templates.

8. The apparatus according to claim 1, wherein any template prepared by encoding the input image data is transmitted to a decoder.

* * * * *